United States Patent
Huddleston

(10) Patent No.: US 7,971,387 B2
(45) Date of Patent: Jul. 5, 2011

(54) SUPPORT DEVICE FOR A FISHING LURE OR BAIT

(75) Inventor: Samuel M. Huddleston, Mesquite, NV (US)

(73) Assignee: Huddleston Deluxe, Inc., Mesquite, NV (US)

( * ) Notice: Subject to any disclaimer, the term of this patent is extended or adjusted under 35 U.S.C. 154(b) by 561 days.

(21) Appl. No.: 12/123,440

(22) Filed: May 19, 2008

(65) Prior Publication Data

US 2008/0289243 A1 Nov. 27, 2008

Related U.S. Application Data

(60) Provisional application No. 60/931,345, filed on May 22, 2007.

(51) Int. Cl.
*A01K 83/06* (2006.01)
(52) U.S. Cl. .............. 43/44.8; 43/44.2; 43/44.6
(58) Field of Classification Search ............. 43/44.8, 43/44.2, 44.6, 44.4
See application file for complete search history.

(56) References Cited

U.S. PATENT DOCUMENTS

| | | | | | |
|---|---|---|---|---|---|
| 2,193,103 | A | * | 3/1940 | Kowalski | 43/44.8 |
| 2,330,517 | A | * | 9/1943 | Rigandi | 43/44.8 |
| 2,653,048 | A | * | 9/1953 | Novak | 294/99.2 |
| 2,727,330 | A | * | 12/1955 | Huff | 43/44.4 |
| 2,775,058 | A | * | 12/1956 | Roberts | 43/44.4 |
| 2,927,393 | A | * | 3/1960 | Joseph et al. | 43/44.2 |
| 3,492,752 | A | * | 2/1970 | Viveiros | 43/36 |
| 3,992,801 | A | * | 11/1976 | McDiarmid et al. | 43/44.8 |
| 5,117,575 | A | * | 6/1992 | Desmond | 43/44.8 |
| 5,890,317 | A | * | 4/1999 | Hollomon | 43/44.8 |
| 6,497,068 | B1 | * | 12/2002 | Lemons | 43/36 |
| 7,481,018 | B1 | * | 1/2009 | Adams | 43/44.2 |
| 7,493,725 | B2 | * | 2/2009 | Sampson | 43/42.3 |

* cited by examiner

*Primary Examiner* — Christopher P Ellis
(74) *Attorney, Agent, or Firm* — Richard T. Ogawa; Ogawa P.C.

(57) ABSTRACT

A device for supporting a soft-bodied lure or bait includes a brace with a connector and a stop. Optionally, the brace is formed from a loop of wire. In such an optional embodiment, the connector may be formed by the loop. A stop may be sized and weighted to form weights. In an optional embodiment, the device may be received into an open-ended channel in the body of a lure or bait. In one such embodiment, the connector protrudes through one end of the channel and the stop protrudes through another end of the channel. A fishing line may be connected to the connector through a hook or the like received by the connector.

18 Claims, 3 Drawing Sheets

SUPPORT DEVICE FOR A FISHING LURE OR BAIT

CROSS-REFERENCES TO RELATED APPLICATIONS

This application claims priority of U.S. Patent Application No. 60/931,345, entitled "SUPPORT DEVICE FOR FISHING LURE OR BAIT," filed by Samuel M. Huddleston on May 22, 2007 commonly assigned, and is incorporated by reference in its entirety.

FIELD OF THE INVENTION

The present invention relates to fishing lures and baits. More particularly, the present invention relates to a support structure for a soft-bodied lure or bait having a brace to distribute the forces of a hook to reduce tearing. Merely by way of example, the invention has been applied to a life like soft lure resembling a crawfish, but can also be applied to other baits such as a helgramite, crab, lizard, waterdog, salamander, mouse, rat, muskrat, bat, bird, dragonfly, goby, eel, sculpin, lobster, shrimp, mudsucker, frog, minnow, baitfish, worm, or any other entity capable of attracting fish or other game.

BACKGROUND OF THE INVENTION

Many times, fisherman cannot predict what lures or baits may successfully attract a fish. It is believed that simulating the appearance and motion of a fish's natural prey will increase the likelihood that a fish will be attracted to the lure or bait. To this end, there has been some experimentation with small lures and baits formed from flexible polymers that allow the body and appendages of the lure or bait to move with a relatively fluid motion. These typically take the form of a silicon polymer body that is threaded onto a hook.

There are drawbacks to these small, soft-bodied lures and baits, however. Because the stress of the hook is focused on a single point on the body, the hook tends to tear through the body. Additionally, because these small bodies have a fairly low weight, sinkers or other external weights are typically added to the fishing line above the hook to hold the body to a desired depth. Aside from the inconvenience of using separate sinkers or weighting devices in addition to the body, using sinkers or other weighting devices on a fishing line away from the body tend to impart an unnatural motion to the body.

From the above, it is seen that techniques for improving fishing lures are highly desired.

BRIEF SUMMARY OF THE INVENTION

According to the present invention, techniques related to fishing lures and baits are provided. More particularly, the present invention relates to a support structure for a soft-bodied lure or bait having a brace to distribute the forces of a hook to reduce tearing. Merely by way of example, the invention has been applied to a life like soft lure resembling a crawfish, but can also be applied to a helgramite, crab, lizard, waterdog, salamander, mouse, rat, muskrat, bat, bird, dragonfly, goby, eel, sculpin, lobster, shrimp, mudsucker, frog, minnow, baitfish, worm, or any other entity capable of attracting fish or other game.

A device includes a brace having a connector and a stop. Optionally, the brace is formed from a strand of wire looped back upon itself.

In an optional embodiment, the connector forms an eyelet adapted to receive a hook. For example, in an optional embodiment in which the brace is formed from a looped wire strand, the connector may be the eyelet formed by the loop opposite the ends of the brace.

Similarly, in an optional embodiment, the stop is formed from weights on the end of the brace opposite the connector. For example, in an optional embodiment in which the brace is formed from a looped wire strand, the stop may be weights on one or both of the ends of the brace.

The device may be used in combination with a soft-bodied lure or bait. In one optional embodiment, a soft-bodied lure or bait is formed from a polymer and includes an open-ended channel therethrough. In one such optional embodiment, the brace is disposed in the channel with the connector protruding through one end of the channel and the stop protruding through the opposite end of the channel. Optionally, the brace is removable from the channel.

In a specific embodiment, the present invention provides a device for supporting a soft-bodied lure or bait. The device has a brace member having a first end, a second end, and a length provided between the first end and the second end. The device also has a connector provided on the first end of the brace member. In a specific embodiment, the connector is configured to couple to a hook. In a preferred embodiment, the hook, which is attached to a line, is allowed to slide through an opening in the brace member with the line attached there to and allow the weighted lure to slide away from the hook, which is attached to a fishing. In a specific embodiment, the device also has a stop structure provided on a second end of the brace member. Of course, there can be other variations, modifications, and alternatives.

In a specific embodiment, the present invention provides a soft body crawfish lure or others. In a specific embodiment, the lure includes a head region and an elongated body portion comprising a first portion and a second portion. In a specific embodiment, the first portion extends into the head region. The lure includes a tail member extending from the second portion. In a specific embodiment, the lure further includes a brace member having a first end, a second end, a length provided between the first end and the second end, a connector provided on the first end of the brace member, and a stop structure provided on a second end of the brace member. In a specific embodiment, the length portion is fully or partially embedded within an inner portion of the elongated body portion such that the stop structure abuts a rear portion of the body member and the connector is exposed outside of the body member or a portion of the head region. In a specific embodiment, the device has a fishing hook inserted within an open portion of the connector and is substantially free from any substantial contact with any portion of the head region.

DETAILED DESCRIPTION OF THE INVENTION

According to the present invention, techniques related to fishing lures and baits are provided. More particularly, the present invention relates to a support structure for a soft-bodied lure or bait having a brace to distribute the forces of a hook to reduce tearing. Merely by way of example, the invention has been applied to a life like soft lure resembling a crawfish, but can also be applied to a helgramite, crab, lizard, waterdog, salamander, mouse, rat, muskrat, bat, bird, dragonfly, goby, eel, sculpin, lobster, shrimp, mudsucker, frog, minnow, baitfish, worm, or any other entity capable of attracting fish or other game.

Figure 1:
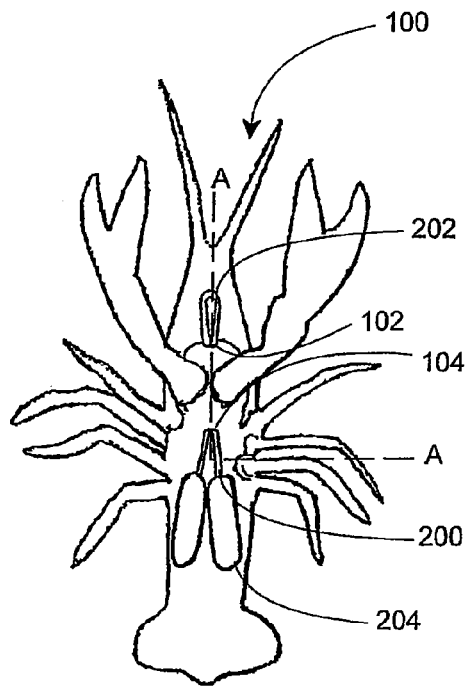
FIG. 1 is a bottom view of a body and a brace according to an embodiment of the present invention.
Figure 2:
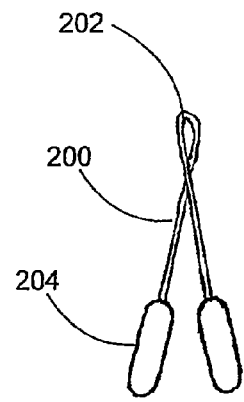
FIG. 2 is a bottom view of a brace according to an embodiment of the present invention.
Figure 3:
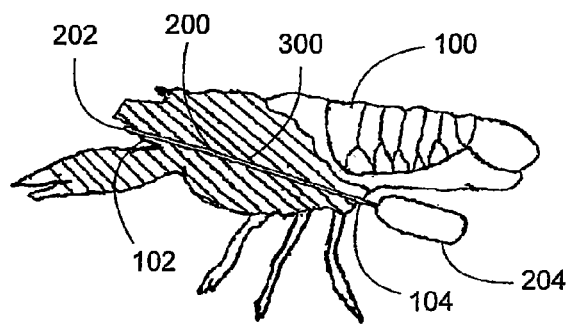
FIG. 3 is a cutaway side view of a body and brace according to an embodiment of the present invention taken along section line A-A of FIG. 1.

Reference is now made to the figures wherein, like parts are referred to by like numerals throughout. Referring generally to FIGS. 1-3, the present invention includes a device to provide support to the body 100 of the soft lure or bait. It is noted that the present device may be used in combination with an artificial lure or bait or may be used in combination with an organic lure or bait. That is, in an optional embodiment, described in greater detail with respect to FIGS. 1 and 3, the present invention could be used in combination with a soft-bodied polymer lure or bait. However, this does not preclude the use of the device in an organic bait (whether or not live). Of course, there can be other variations, modifications, and alternatives.

Figure 2A:
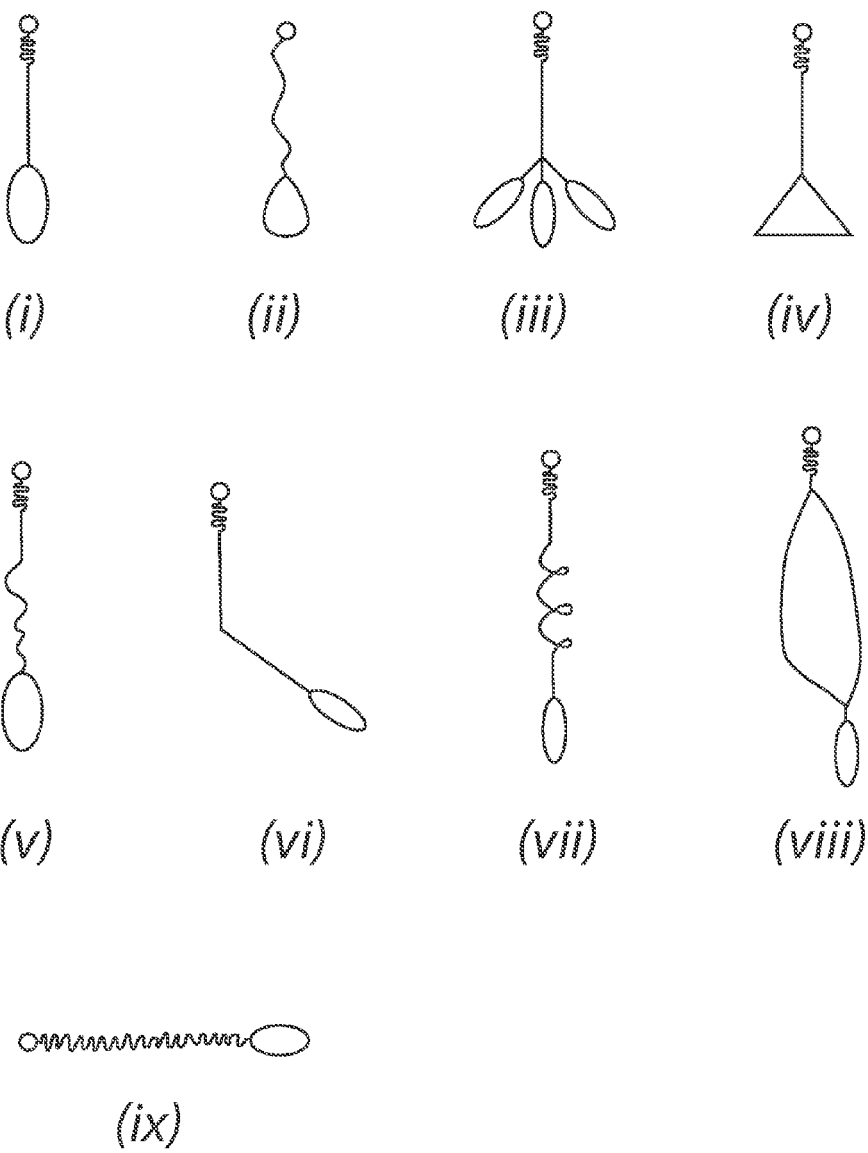
FIG. 2A illustrates simplified view of other brace structures according to other embodiments of the present invention.

With reference to FIGS. 1-3, the present invention includes a brace 200. The brace 200 includes a connector 202 and a stop 204. Briefly, the connector 202 receives a hook or otherwise connects to a fishing line. The brace 200 distributes forces transmitted from the fishing line through the connector. The stop 204 secures the brace 200 to the body 100. In a specific embodiment, the stop abuts against a portion of the body to hold the body in place. In a specific embodiment, the stop can be a pair of weighted structures or one or more weighted structures. In a specific embodiment, the one or more weighted structures has a cylindrical shape, a pyramidal shape, a bullet shape, or a canon ball shape, any combination of these, and the like, as illustrated by FIG. 2A, for example.

The brace 200 may take any form. For example, the brace 200 could be any structural support, such as a rod, tube, wire, or the like, to distribute forces over the body 100. In other embodiments, the brace can be made of a metal, a plastic, or other suitable material, which may be rigid or non-rigid, e.g., soft string or wiring. Depending upon the embodiment, the brace can be made of a rigid wire, braided wire, string, molded plastic, or any combination of these, among others, including a bi-material that includes a first portion of rigid wire and a flexible portion or any other combinations and the like. See, for example, FIG. 2A. Of course, there can be other variations, modifications, and alternatives. Similarly, the connector 202 may take any form suitable for connecting to a fishing line. Thus, where the connector 202 connects to a fishing line directly or through a hook or swivel, the connector 202 may take the form of an eyelet or loop. Alternatively, the connector can be multiple loops according to a specific embodiment. Of course, there can be other variations, modifications, and alternatives.

For example, referring to FIG. 2, in an optional embodiment, the brace 200 is a strand of wire looped back on itself. In such an optional embodiment, the connector 202 may be formed by the loop in the strand of wire. In a specific embodiment, the wire loop can include multiple loops or other configurations. In a specific embodiment, the loop of wire is configured as the connector on the first end and includes at least a pair of wire members extending from the first end, crossing over within a spatial portion of the length and including a first length structure having a first length end and a second length structure having a second length end. In a specific embodiment, the first length end comprises a first portion of the stop structure and the second length end comprises a second portion of the stop structure. Of course, there can be other variations, modifications, and alternatives.

In a specific embodiment, the connector protrudes out or partially protrudes out of the body, while an opening of the connector may be within a vicinity of a portion of the body or rests on a portion of the body, which allows the hook to be inserted through the connector and maintains the hook in place by being sandwiched between the portion of the body and the connector. Alternatively, the hook can be inserted into a small portion of the body to keep it in place but the hook may tear the portion of the body away or slide through the portion of the body once the hook become lodged into an interior or exterior of a fish, which was attracted to the lure and may be fighting the fisherman. In a preferred embodiment, the hook has a much smaller size and is substantially free from insertion into a main body portion of the fishing lure as conventional lure designs. Of course, there can be other variations, modifications, and alternatives.

The stop 2004 may be formed by any structure. In the optional embodiment of FIG. 2, for example, the stop 204 is formed from expansions on one or both of the ends of a looped strand of wire. In an optional embodiment, the expansions may be weighted to form weights. It is noted that in such an optional embodiment, the weights may be positioned, sized, and weighted with respect to the body 100 to impart a particular motion to the body 100 when released in water. Depending upon the embodiment, the weights can have a variety of shapes including cylindrical shape, a pyramidal shape, a bullet shape, or a canon ball shape, any combination of these, and the like. Of course, there can be other variations, modifications, and alternatives.

Figure 4:
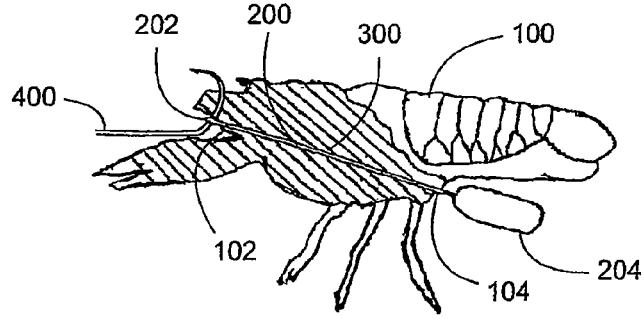
FIG. 4 is a cutaway side view of the body and brace of FIG. 3 with a hook threaded through the connector and body according to an embodiment of the present invention.

For example, in FIGS. 1, 3, and 4, a body 100 may be provided. In an optional embodiment, the body 100 is molded or shaped from a soft, flexible material such as a polymer. In such an optional embodiment, any polymer, such as polyvinyl chloride ("PVC") or a silicon-based polymer, could be used. In a specific embodiment, the body can be configured as a crawfish, a mud sucker, a turtle, a duck, a minnow, a frog or other living entity such as a helgramite, crab, lizard, waterdog, salamander, mouse, rat, muskrat, bat, bird, dragonfly, goby, eel, sculpin, lobster, shrimp, baitfish, worm, or any other entity capable of attracting fish or other game. In a specific embodiment, the body can be hollow and capable of floating, or have a chamber, including a weight, or other configuration. Of course, there can be other variations, modifications, and alternatives.

The brace 200 may be attached to the body 100 in any fashion. For example, it is contemplated that the brace 200 may be attached to the body 100 at the exterior or the interior of the body 100. Thus, in one such optional embodiment, the body 100 includes an open-ended channel 300. The brace 200 is threaded through the channel 300 with the connector 202 protruding through one opening 102 of the channel 300 and the stop 204 protruding through another opening 104 of the channel 300. The brace 200 may be secured inside the channel 300 (such as with adhesive) or may be removable from the channel 300.

In a specific embodiment, the open ended channel can be embedded within the body, or also expose one or more portions of the brace. In a specific embodiment, the brace can include portions that are exterior to the body and portions that are interior to the body. Of course, there can be other variations, modifications, and alternatives.

Figure 4A:
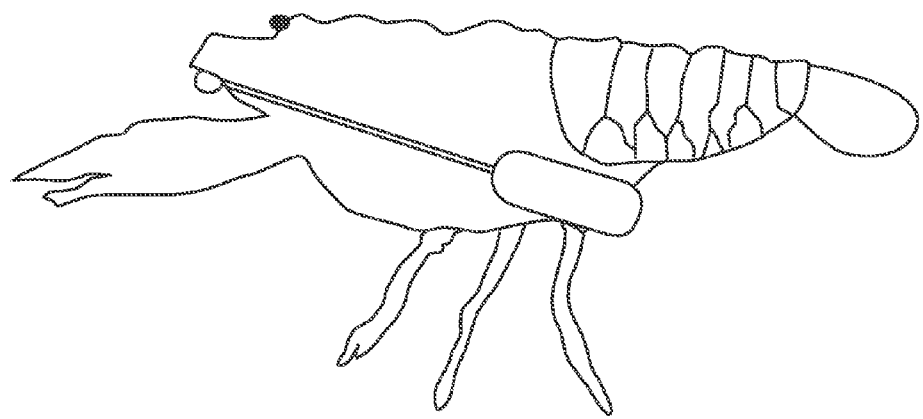
FIG. 4A is a cutaway side view of the body and brace with a hook threaded through the connector and body according to an alternative embodiment of the present invention.

In use, a hook 400 or other device for connecting to a fishing line (such as swivel or the like) is attached to the connector 202. In an optional embodiment, such as that shown in FIG. 4, in which a hook 400 is used, the hook 400 may be passed through the body 100 as well. Forces transmitted through fishing line (such a through a hook 400) to the connector 202 are distributed through the body 100 by the brace 200 and stop 204 to thereby reduce the risk of tearing of the body 100. Additionally, in such an optional embodiment, the connector 202 provides reinforcement at the point where the hook 400, or other device connecting the body to a fishing line, passes through the body to reduce the risk of tearing the body 100. In a specific embodiment as shown, the brace member is coupled to the soft body at an angle ranging from about 70 to about 80 degrees from a lateral line running from a head region to a tail region of the soft body to maintain the lure in a lifelike upright position, which has the head region facing up. Referring to FIG. 4A, the stop can be partially or fully surrounded by a portion of the body member, as shown. Of course, there can be other variations, modifications, and alternatives.

In a preferred embodiment, the hook is inserted through the connector and also inserted through a portion of the soft body. In a specific embodiment, the hook is supported and is held by a portion of the soft body and does not dislodge from the soft body. The hook is also coupled and inserted through the connector that is used to pull the soft body. In a specific embodiment, the stop holds the brace in place while the soft bait is being pulled. Of course, there can be other variations, modifications, and alternatives.

In a preferred embodiment, the present device and method allows for a small hook to be used effectively with a large volume bait, such as a large volume plastic bait. In a specific embodiment, the present device can be used with a smaller hook design such as a size four, six, eight, ten, or others. In a preferred embodiment, the hook can be smaller in size such as ½ inch and less relative to a volume of a lure body size of about two or three inches across a substantial portion of three dimensions. I discovered that conventional large volume soft lures such as frogs, etc. often require much larger hook with large gaps to hold the bait effectively. In a preferred embodiment, the present device allows for the hook to be coupled to the plastic bait without being inserted into the plastic itself or inserted into a substantial portion of the plastic body, which may possibly interfere with the action of hooking the fish. Of course, there can be other variations, modifications, and alternatives.

In a specific embodiment, the hook can also slide through with the line attached to it to allow the weighted plastic bait to be a distance away from a hooked fish. In a specific embodiment, the hooked fish, which often has a shaking head, cannot use the weighted plastic bait to lever against the hook and throw the hook when the fishing angler is fighting the fish. In a specific embodiment, the hook may also be embedded slightly into a portion of the plastic, which is broken away once the fish strikes and/or begins fighting against the line and angler. Of course, there can be other variations, modifications, and alternatives.

While certain embodiments of the present invention have been shown and described it is to be understood that the present invention is subject to many modifications and changes without departing from the spirit and scope of the invention presented herein. Additionally, as used herein, the term "first" and "second" are not intended to imply any order but can be interpreted as broadly according to one of ordinary skill in the art. Of course, there can be other variations, modifications, and alternatives.

What is claimed is:

1. A device for supporting configured to distribute a force of a hook to reduce tearing of a soft-bodied lure or bait, the device comprising:
   a brace member having a first end, a second end, and a length provided between the first end and the second end;
   a connector provided on the first end of the brace member, the connector being configured to couple to the hook; and
   a stop structure provided on a second end of the brace member;
   wherein the length is configured to be fully or partially embedded within an inner portion of the soft-bodied lure or bait;
   wherein the hook is configured to be inserted within an open portion of the connector and is substantially free from any substantial contact with any portion of the soft-bodied lure or bait to reduce tearing of the soft-bodied lure or bait; and
   wherein the stop structure comprises a weight having a spatial volume to abut an outer portion of the soft-bodied lure or bait to hold the device in place.

2. The device of claim 1 wherein the brace member and connector are provided by a loop of wire.

3. The device of claim 1 wherein the loop of wire is substantially rigid.

4. The device of claim 1 wherein the loop of wire is configured as the connector on the first end and includes at least a pair of wire members extending from the first end, crossing over within a spatial portion of the length and including a first length structure having a first length end and a second length structure having a second length end, the first length end comprising a first portion of the stop structure and the second length end comprising a second portion of the stop structure.

5. The device of claim 4 wherein the first portion of the stop structure comprises a first weight, the first weight having a first spatial volume and the second portion of the stop structure comprising a second weight, the second weight having a second spatial volume, and wherein the weight comprising the first weight and the second weight.

6. The device of claim 1 wherein the stop structure is formed by one or more weights, each of the one or more weights being made of a material selected from lead, tungsten, iron, or any alloys thereof.

7. The device of claim 1 wherein the stop structure is selected from one or more weights having a cylindrical shape, one or more weights having a pyramidal shape, one or more weights having a bullet shape, or one or more weights having a canon ball shape.

8. The device of claim 1 wherein the brace member is configured to be provided in an open-ended channel in a soft body of a lure or bait such that the connector protrudes through a first end of the channel and the stop structure protrudes through a second end of the channel.

9. The device of claim 4 wherein the hook is configured to move the soft body of the lure or bait by a pulling action of a line connected to an eye of the hook while the stop structure mechanically couples the soft body to the brace member such that the soft body is substantially fixed to the brace member.

10. The device of claim 1 wherein the brace member is coupled to the soft body at an angle ranging from about 70 to about 80 degrees from a lateral line running from a head region to a tail region of the soft body.

11. The device of claim 1 wherein the brace member is coupled to a soft body of an organic bait, a plastic bait, a live bait, or other bait.

12. A soft body crawfish lure comprising:
a head region;
an elongated body portion comprising a first portion and a second portion, the first portion extending into the head region;
a tail member extending from the second portion;
a brace member having a first end, a second end, a length provided between the first end and the second end, a connector provided on the first end of the brace member, and a stop structure provided on a second end of the brace member, the length portion being fully or partially embedded within an inner portion of the elongated body portion such that the stop structure abuts a rear portion of the body member and the connector is exposed outside of the body member or a portion of the head region; and
a fishing hook inserted within an open portion of the connector and being substantially free from any substantial contact with a portion of the head region or a portion of the body member;
wherein the fish hook is configured substantially free from contact with the portion of the head region or the portion of the body member to reduce tearing of the body member; and
wherein the stop structure comprises a weight having a volume to be exposed outside of the rear portion of the body member.

13. The lure of claim 12 wherein the connector is configured from one or more loops in a wire member having a first end terminated by a first stop structure and a second end terminated by a second stop structure, the first stop structure being a first weight structure and the second stop structure being a second weight structure, and wherein the weight comprises the first weight structure and the second weight structure.

14. The lure of claim 12 wherein the head region, elongated body portion and the tail member are provided from a molded volume of plastic material.

15. The lure of claim 12 wherein the stop structure comprises a first weighted structure and a second weighted structure, and wherein the weight comprises the first weighted structure and the second weighted structure.

16. The lure of claim 12 wherein the brace member is inserted at an angle ranging from about 70 to about 80 degrees from a line extending from the head region to the tail member.

17. The lure of claim 12 wherein the head region, elongated body portion, and tail member are formed from an organic bait material.

18. The lure of claim 12 wherein the elongated body comprises a plurality of legs on each side of the elongated body and a pair of claws extending from a lower portion of the body portion.

* * * * *